United States Patent [19]
Mikami et al.

[11] Patent Number: 5,328,965
[45] Date of Patent: Jul. 12, 1994

[54] CURABLE ORGANOSILICONE COMPOSITION

[75] Inventors: Ryuzo Mikami; Tadashi Okawa, both of Chiba, Japan

[73] Assignee: Dow Corning Toray Silicone Co., Ltd., Tokyo, Japan

[21] Appl. No.: 34,338

[22] Filed: Mar. 22, 1993

[51] Int. Cl.$^5$ .................... C08L 83/10; C09D 183/10; C09J 7/04

[52] U.S. Cl. ..................................... 525/446; 525/474

[58] Field of Search .................................. 525/446, 29

[56] References Cited

U.S. PATENT DOCUMENTS

| | | | |
|---|---|---|---|
| 4,332,844 | 6/1982 | Hamada et al. | 427/387 |
| 5,082,916 | 1/1992 | Mikami et al. | 528/26 |
| 5,208,289 | 4/1993 | Takarada et al. | 525/100 |

FOREIGN PATENT DOCUMENTS

| | | |
|---|---|---|
| WO9010665 | 9/1990 | European Pat. Off. . |
| 23325 | 3/1972 | Japan . |

*Primary Examiner*—Ralph H. Dean
*Attorney, Agent, or Firm*—Sharon K. Severance

[57] ABSTRACT

The introduction of a curable organosilicone composition that affords a very releasable, highly printable cured film that is strongly adhesive for such substrates as polyester film and so forth.

Curable organosilicone composition that is composed of (A) polyorganosiloxane-grafted, aliphatic ally unsaturated polyester (B) organopolysiloxane that contains at least 3 silicon-bonded hydrogen atoms in each molecule, and (C) hydrosilylation-reaction catalyst.

5 Claims, No Drawings

CURABLE ORGANOSILICONE COMPOSITION

BACKGROUND OF THE INVENTION

Curable organosilicone compositions that have good release properties are known in the art. For example, Japanese Patent Publication [Kokoku]Number Sho 47-23325 [23,325/1972] discloses a composition comprised of a of silanol-endblocked polydimethylsiloxane, an organopolysiloxane having at least 5 silicon-bonded hydrogen atoms in each molecule, and an organotin curing catalyst. In addition, U.S. Pat. No. 4,332,844 discloses a composition comprised of a polydimethylsiloxane having silicon- bonded aliphatically unsaturated groups, an organopolysi loxane having at least 2 silicon-bonded hydrogen atoms in each molecule, and a platinum group metal catalyst. With each of these compositions, the film afforded by cure under specified conditions is highly releasing and is therefore used in a wide variety of industrial sectors as a release coating.

However, these curable compositions suffer from various drawbacks in their applications as release coatings. These compositions are poorly adhesive for polyester film and polypropylene film substrates. A particular problem is that their cured films cannot be printed. As a consequence, adhesion by the cured film for the substrate has typically been improved by subjecting the fi].m substrate to a plasma treatment prior to application of the curable composition. However, this procedure is economically disadvantageous because it requires an extra process in the form of the plasma treatment. Moreover, it does not solve the problem of poor printability, and it has been necessary to accept major limitations on both concept and design.

It is an object of the present invention the introduction of a curable organosilicone composition that forms a highly releasing cured film that is strongly adhesive for such substrates as polyester film and that has good printing properties.

THE INVENTION

The present invention relates to a novel curable organosilicone composition. More specifically, the present invention relates to a curable organosilicone composition that can be cured by briefly baking at low temperatures to give a highly releasing cured film that is strongly adhesive for such substrates as polyester film and that has good printing properties.

The present invention relates to a curable organosilicone composition comprised of (A) polyorganosiloxane-grafted, aliphatically unsaturated polyester, (B) organopolysiloxane that contains at least 3 silicon-bonded hydrogen atoms in each molecule, and (C) hydrosilylation-reaction catalyst.

The polyorganosiloxane-grafted, aliphatically unsaturated polyester resin used by the present invention is known in the art or can be obtained by the method disclosed in U.S. Pat. No. 5,082,916, herein incorporated by reference. In this method, the desired polyorganosiloxane-grafted, aliphatically unsaturated polyester resin is obtained by an addition reaction between aliphatically unsaturated polyester resin and polyorganosiloxane carrying silicon-bonded hydrogen only at a single terminal. This reaction must be run with the moles of aliphatically unsaturated groups in the polyester resin in excess over the moles of silicon-bonded hydrogen atoms in the polyorganosiloxane. The reason for this is that the cured film produced from the composition of the instant invention is generated by a crosslinking reaction between component (B) and unreacted aliphatically unsaturated groups remaining in the polyester.

The organohydrogenpolysi loxane in compoent (B) is a crosslinker for ingredient (A). The present compositions are cured by an addition reaction between the silicon-bonded hydrogen atoms of component (B) and the aliphatically unsaturated radicals in component (A) employing the catalytic activity of component (C).

Component (B) must contain at least 3 silicon-bonded hydrogen atoms in each molecule. The molecular structure of component (B) is not specifically restricted, and may be any of straight chain, straight chain containing branch points, cyclic, and so forth.

The molecular weight of component (B) is likewise not specifically restricted, but viscosities at 25 degrees Centigrade of 1 to 50,000 centipoise are preferred. The concentration of component (B) is sufficient to provide a molar ratio of silicone-bonded hydrogen atoms present in this component to alphatically unsaturated radicals present in ingredients (A) to form 0.5:1 to 20:1. It is difficult to obtain good curing properties when this molar ratio falls below 0.5:1. On the other hand, when this value exceeds 20:1, there is an undesirable tendency for the cured product to become too hard when heated.

Specific examples of component (B) include but are not limited to:
  trimethylsiloxy-terminated methylhydrogenpolysi loxanes,
  trimethylsiloxy-terminated dimethylsiloxane-methylhydrogensiloxane copolymer,
  dimethylhydrogensiloxy-terminated dimethylsiloxane-methylhydrogensiloxane copolymer,
  dimethylsiloxane-methylhydrogensiloxane cyclic copolymer, copolymers comprised of the $(CH_3)_2HSiO_{\frac{1}{2}}$ unit and the $SiO_{4/2}$ unit, and copolymer comprised of the $(CH_3)_3SiO_{\frac{1}{2}}$ unit, and the $(CH_3)_2HSiO_{\frac{1}{2}}$ unit, and the $SiO_{4/2}$ unit.

The hydrosilylation-reaction catalyst, component (C), of the present invention functions to accelerate the addition reaction between the aliphatically unsaturated groups in component (A) and the silicon-bonded hydrogen atoms in component (B) . This component may be exemplified by, but not limited to, the known complex compounds of transition metals such as platinum, palladium, rhodium, ruthenium, cobalt, nickel, and others. Preferred among the preceding are platinum group metal catalysts, which may be exemplified by, but not limited to, chloroplatinic acid, chloroplatinic acid dissolved in alcohol or ketone, chloroplatinic acid/olefin complexes, chloroplatinic acid/alkenylsiloxane complexes, platinum black, and platinum supported on a carrier. Component (C) should be added at 0.1 to 500 weight parts metal as listed above for each 1,000,000 parts of the total of components (A) and (B) . The crosslinking addition reaction will not adequately develop at below 0.1 weight part. The use of more than 500 weight parts corresponds to the unnecessary use of expensive metal and is therefore uneconomical. A fresh addition of catalyst will be unnecessary when component (A) has been prepared using a platinum group metal catalyst and the catalyst has not been eliminated after the reaction.

The composition of the present invention can be prepared by simply mixing components (A), (B), and (C). However, in addition to components (A) through (C), the composition may contain a known inhibitor whose purpose is to retard the crosslinking addition reaction. For example, an acetylenic coinpound, hydrazine compound, triazole, phosphine, mercaptan, organic amine, or others can be added in a suitable quantity in order to obtain a desirable reaction rate.

In addition, the following may be added as desired: reinforcing filler for the purpose of improving the physical strength of the cured product, diluting solvent to facilitate use as a coating agent, various dyes and pigments in order to impart color, additives that improve the heat stability and flame retardancy, additives that adjust the release characteristics, plasticizer, and others.

The composition of the present invention as produces a cured film that strongly adheres to substrates such as polyester film and that has an excellent release performance and printing characteristics. The curable organosilicone coinposition of the present invention is further characterized by its ability to cure at relatively low temperatures in a brief period of time. The composition of the present invention is therefore useful as a release coating where such properties are critical.

So that those skilled in the art can understand and appreciate the invention taught herein, the following examples are presented, being it understood that these examples should not be used to limit the scope of this invention found in the claims attached hereto.

In the examples, "parts" denotes "weight parts" and "%" denotes "weight %".

REFERENCE EXAMPLE 1

Synthesis and silylation of silicone-polyester resin:

The following were introduced into a 1 L four-neck flask equipped with stirrer, nitrogen inlet tube, thermometer, and reflux condenser fitted with a distillation column: 290.4 parts isophthalic acid, 58.7 parts glycerol monoallyl ether, 174.7 parts neopentyl glycol, and 35 parts xylene. This was gradually heated to 230° C. under a nitrogen current. While maintaining this temperature, the water evolved by the condensation reaction was removed through the distillation column. Sampling was conducted at regular intervals and the acid value of the sample was measured. When the acid value had dropped to five or less, the low boilers were distilled out at reduced pressure. Approximately 450 parts polyester resin was obtained in the form of a light yellow solid at room temperature. This polyester resin had a carbinol group content of 1.6%. Its number-average molecular weight was 3,534 according to gel permeation chromatography.

The carbinol groups were blocked by the trimethylsiloxy group using the following procedure:

100 parts of the polyester resin prepared as described above was dissolved in 150 parts toluene in a four-neck flask equipped with stirrer, nitrogen inlet tube, thermometer, and reflux condenser. After dissolution to homogeneity, 10 parts hexamethyldisilazane was added and a silylation reaction was run for 10 hours at the reflux temperature of toluene. After silylation, the toluene and unreacted hexamethyldisilazane were distilled off to give a polyester resin in the form of a light brown solid at room temperature. Analysis of this polyester resin by nuclear magnetic resonance spectroscopy confirmed the presence of the chemical shift attributable to the trimethylsiloxy group and the complete blocking of the carbinol group by the trimethylsiloxy group. This polyester resin had a number-average molecular weight of 3,647 by GPC. Its vinyl content was 2.4%.

EXAMPLE 1

10 parts of the polyester resin of Reference Example 1 (0.0089 moles vinyl group) was homogeneously dissolved in 149.4 parts tetrahydrofuran in a four-neck flask fitted with stirrer, reflux condenser, nitrogen inlet tube, and thermometer. 6.6 parts polydimethylsiloxane with the following formula (molecular weight of 1818.2, 0.00363 moles silicon-bonded hydrogen) was then introduced.

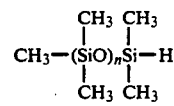

This mixture was gradually heated to 70° C., and a 1% tetrahydrofuran solution of chloroplatinic acid was introduced to provide a platinum metal concentration of 0.001% in the reaction mixture. While continuing the reaction at 70° C., aliquots of the reaction mixture were periodically sampled onto a glass plate and the solvent was expelled from the sample. The reaction was run until this reaction mixture sample became transparent. After the reaction the solvent was distilled off to afford 16.1 parts of a polydimethylsiloxane-grafted unsaturated polyester resin (a). This resin was a solid at room temperature.

2 parts of this polydimethylsiloxane-grafted polyester resin (a) was dissolved to homogeneity in 2 parts methyl acetate. A curable composition was obtained by the addition to this solution of 0.1 parts 1% tetrahydrofuran solution of chloroplatinic acid and 0.10 parts polymethysiloxane with the following formula.

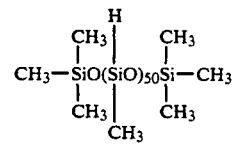

This curable coinposition was coated on polyethylene terephthalate film. After coating, the film was baked in an oven at 150° C. for 10 minutes. The cured film afforded thereby adhered strongly to the polyethylene terephthalate. The releaseability was also excellent as indicated by the values of 10 to 15 g/2 cm-width that were obtained when the peeling resistance was measured using a commercial cellophane tape. In addition, characters were written on the cured film using an oil-based Magic Ink marker. No ink crawling was observed, and the writing characteristics were excellent. Moreover, the written characters were themselves strongly adherent to the cured film and could not be removed by rubbing.

EXAMPLE 2

10 parts of the polyester resin of Reference Example 1 (0.0089 moles vinyl group) was homogeneously dissolved in 213 parts tetrahydrofuran in a four-neck flask fitted with a stirrer, reflux condenser, nitrogen inlet tube, and thermometer. 13.6 parts polydimethylsiloxane with the following formula (molecular weight of 3,750, 0.00363 moles silicon-bonded hydrogen) was then introduced.

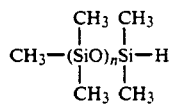

This mixture was gradually heated to 70° C., and a 1% tetrahydrofuran solution of chloroplatinic acid was introduced to provide a platinum metal concentration of 0.001% in the reaction mixture. While continuing the reaction at 70° C., aliquots of the reaction mixture were periodically sampled onto a glass plate and the solvent was expelled from the sample. The reaction was run until this reaction mixture sample became transparent. The solvent was distilled after the reaction to afford 23.4 parts of a polydimethylsiloxane-grafted polyester resin (b). This resin was a solid at room temperature.

2 parts of this polydimethylsiloxane-grafted polyester resin (b) was dissolved to homogeneity in 2 parts methyl acetate. A curable composition was obtained by the addition to this solution of 0.1 parts 1% tetrahydrofuran solution of chloroplatinic acid and 0.10 parts polymethysiloxane with the following formula.

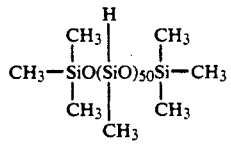

This curable composition was coated on polyethylene terephthalate film. After coating, the film was baked in an oven at 150° C. for 10 minutes. The cured film afforded thereby adhered strongly to the polyethylene terephthalate. The releaseability was also excellent as indicated by the values of 8 to 10 g/2 cm-width that were obtained when the peeling resistance was measured using a commercial cellophane tape. In addition, characters were written on the cured film using an oil-based Magic Ink marker. No ink crawling was observed, and the writing characteristics were excellent. Moreover, the written characters were themselves strongly adherent to the cured film and could not be removed by rubbing.

EXAMPLE 3

10 parts of the polyester resin of Reference Example 1 (0.0089 moles vinyl group) was homogeneously dissolved in 334 parts tetrahydrofuran in a four-neck flask fitted with a stirrer, reflux condenser, nitrogen inlet tube, and thermometer. 23.4 parts polydimethylsiloxane with the following formula (molecular weight of 6,667, 0.00354 moles silicon-bonded hydrogen) was then introduced.

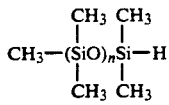

This was gradually heated to 70° C., and a 1% tetrahydrofuran solution of chloroplatinic acid was introduced to provide a platinum metal concentration of 0.001% in the reaction mixture. While continuing the reaction at 70° C., aliquots of the reaction mixture were periodically sampled onto a glass plate and the solvent was expelled from the sample. The reaction was run until this reaction mixture sample became transparent. The solvent was distilled after the reaction to afford 33.2 parts of a polydimethylsiloxane-grafted polyester resin (c). This resin was a solid at room temperature.

2 parts of this polydimethylsiloxane-grafted polyester resin (c) was dissolved to homogeneity in 2 parts methyl acetate. A curable composition was obtained by the addition to this solution of 0.1 parts 1% tetrahydrofuran solution of chloroplatinic acid and 0.10 parts polymethysiloxane with the following formula.

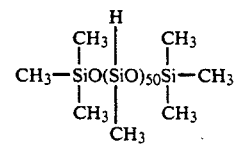

This curable composition was coated on polyethylene terephthalate film. After coating, the film was baked in an oven at 150° C. for 10 minutes. The cured film afforded thereby adhered strongly to the polyethylene terephthalate. The releaseability was also excellent as indicated by the values of 5–8 g/2 cm-width that were obtained when the peeling resistance was measured using a commercial cellophane tape.

What is claimed is:

1. A curable organosilicon composition comprised of
   (A) polyorganosiloxane-grafted polyester, wherein said polyester contains aliphatically unsaturated groups,
   (B) organopolysiloxane that contains at least 3 silicon-bonded hydrogen atoms in each molecule, and
   (C) hydrosilylation-reaction catalyst.

2. A composition as claimed in claim 1 wherein component (B) is a selected from the group consisting of trimethylsiloxy-endblocked polymethylhydrogensiloxane, trimethylsiloxy-endblocked polydimethylsiloxane-polymethylhydrogensiloxane copolymer, dimethylhydrogensiloxy-endblocked polydimethylsiloxane-polymethylhydrogensiloxane copolymer, 1,3,5,7- tetramethylcyclotetrasiloxane, 1,3,5,7,9-pentamethycyclopentasiloxane, copolymer resin comprised of $SiO_{4/2}$ and $(CH_3)_2HSiO_{\frac{1}{2}}$ units, and copolymer resin comprised of $SiO_{4/2}$, $(CH_3)_3SiO_{\frac{1}{2}}$, and $(CH_3)_2HSiO_{\frac{1}{2}}$ units.

3. A composition as claimed in claim 1 wherein component (B) is an organopolysiloxane having the formula

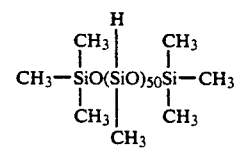

4. A composition as claimed in claim 1 wherein the hydrosilylation-reaction catalyst is a platinum group metal catalyst.

5. A composition as claimed in claim 4 where the hydrosilylation-reaction catalyst is chloroplatinic acid.

* * * * *